Patented Sept. 27, 1932

1,879,206

UNITED STATES PATENT OFFICE

HEINRICH GÜNZLER AND ARNOLD MORÉ, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK

PROCESS OF PREPARING PHENYL MERCURIC ACETATE

No Drawing. Application filed October 21, 1929, Serial No. 401,378, and in Germany October 30, 1928.

The present invention relates to a process of preparing phenyl-mercuric acetates, more particularly preparing of the compound of the probable formula:

$$C_6H_5.Hg.O.OC.CH_3$$

According to our invention phenyl-mercuric acetate is prepared by heating benzene with mercuric oxide and glacial acetic acid. Instead of mercuric oxide there may be used mercuric acetate, this compound being equivalent to mercuric oxide for the purpose of the invention. The quantities of the three components reacting with each other may be varied within the widest limits, but generally we are using a large excess of benzene and of glacial acetic acid, say an excess of 10–100 fold of the theory. The temperatures required range between about 60° C. and the boiling point of the reaction mixture, and the reaction is complete after heating for several hours, say 3–10 hours.

The invention is illustrated by the following example, but is not restricted thereto:

*Example.*—54 grams of mercuric oxide are heated with 150 cc. of glacial acetic acid and 300 cc. of benzene on a reflux condenser for 2–3 hours. After distilling off the excess of benzene and glacial acetic acid the phenyl mercuric acetate remains as a solid crystallized mass.

We claim:

1. The process which comprises heating mercuric oxide with benzene and glacial acetic acid at a temperature between about 60° C. and the boiling point of the mixture for several hours.

2. The process which comprises heating one molecular quantity of mercuric oxide with about 10–100 molecular quantities of benzene and of glacial acetic acid between about 60° C. and the boiling point of the mixture for about several hours.

3. The process which comprises boiling under reflux for about 2–3 hours a mixture of about one molecular quantity of mercuric oxide, 10–100 molecular quantities of benzene and 10–100 molecular quantities of glacial acetic acid.

In testimony whereof, we affix our signatures.

HEINRICH GÜNZLER.
ARNOLD MORÉ.